United States Patent [19]
Holyoak

[11] 4,089,783
[45] May 16, 1978

[54] FILTER

[75] Inventor: Kenneth Holyoak, Ravenshead, England

[73] Assignee: Crosland Filters Limited, Bolborough, England

[21] Appl. No.: 770,627

[22] Filed: Feb. 22, 1977

Related U.S. Application Data

[63] Continuation of Ser. No. 615,801, Sep. 23, 1975, abandoned, which is a continuation-in-part of Ser. No. 545,351, Jan. 30, 1975, abandoned.

[30] Foreign Application Priority Data

Feb. 8, 1974 United Kingdom .................. 5825/74

[51] Int. Cl.$^2$ ............................................. B01D 25/00
[52] U.S. Cl. .................... 210/358; 210/487; 210/493 R; 428/36; 428/181; 428/233; 428/236; 428/246; 428/247; 428/256; 428/285; 428/298

[58] Field of Search ............... 210/487, 489, 493, 499, 210/358; 55/521; 428/181, 233, 236, 247, 255, 256, 285, 298, 36

[56] References Cited

U.S. PATENT DOCUMENTS

| 2,692,654 | 10/1954 | Pryor | 210/489 |
| 3,063,888 | 11/1962 | Howard et al. | 210/484 |
| 3,115,459 | 12/1963 | Giesse | 210/493 |
| 3,209,916 | 10/1965 | May et al. | 210/489 |

Primary Examiner—James J. Bell
Attorney, Agent, or Firm—Kane, Dalsimer, Kane, Sullivan and Kurucz

[57] ABSTRACT

A multi-layer filter material assembly. The assembly includes a filter medium which consists of a single sheet formed of fibers of a glass having a low coefficient of thermal expansion. The filter medium is supported on each side by at least one sheet of bonded synthetic fibers and a sheet of metallic wire mesh. The two sheets of metallic wire mesh form the two outermost layers and the entire assembly is formed into a pleated configuration.

5 Claims, 3 Drawing Figures

FILTER

CROSS REFERENCE TO RELATED APPLICATIONS

This is a continuation of application Ser. No. 615,801, filed Sept. 23, 1975 now abandoned and which is a continuation in part of my previously filed application Ser. No. 545,351 filed Jan. 30, 1975, now abandoned.

BACKGROUND OF THE INVENTION

This invention relates to filters used in internal combustion engines and hydraulic and other machinery and more especially to materials used in such filters, the object of the invention being to provide in an improved form filter material which is capable of effecting a very fine filtration.

SUMMARY OF THE INVENTION

In accordance with the invention there is provided a filter material which comprises an assembly formed by a sheet of fibers of a glass having a low coefficient of thermal expansion, at least one sheet of bonded fibers disposed on each side of the glass fiber sheet, and two sheets of metallic wire mesh disposed respectively on the two sides of the assembly in engagement with the bonded fiber sheets.

Preferably, each of the sheets of metallic wire mesh is formed from aluminum wire and desirably on the inner side (considering the intended direction of flow of fluid through the filter) of the glass fiber sheet (which forms the actual filtration media) there are provided two sheets of bonded fibers.

The invention will now be more particularly described with reference to the accompany drawings.

DESCRIPTION OF THE PREFERRED EMBODIMENTS

Figure 1:
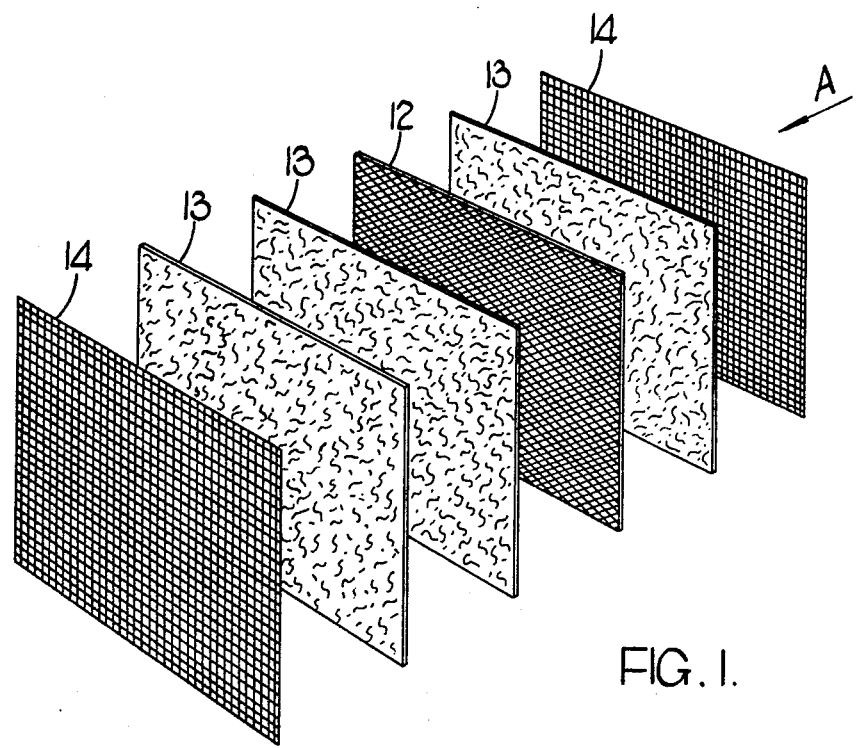
FIG. 1 is an exploded perspective view of one example of a filter material constructed in accordance with the invention.

Referring to the drawings, the example of filter material shown therein is formed of a number of sheets as will be hereinafter described to provide an assembly which is then arranged in a pleated cylindrical configuration as is indicated by reference numeral 10 in FIG. 2. Such a pleated assembly is then arranged on a perforated center tube 11 having at each end an end cap 15 and 16 as shown in FIG. 3 of which cap 15 is apertured so that in use a fluid to be filtered will flow through a perforated outer casing 9 and thence through the pleated cylindrical assembly, through said assembly and thence into the perforated center tube and finally out of the aperture in the apertured end cap 15.

The aforementioned filter material is shown in more detail in FIG. 1 and comprises a plurality of sheets and the actual filtration media is formed of a bonded glass fiber sheet 12, the glass being of a kind having a low coefficient of thermal expansion such as for example borasilicate glass. With regard to glass sheet 12 which forms the actual filter medium, the term "glass" having a lower coefficient of thermal expansion is one which is well known in the art and borasilicate glass is an example of such a glass. Naturally other well known, acceptable and conventional substitutes can be used therefor.

In addition to the requirement that the glass have a low coefficient of thermal expansion, the glass fibers forming sheet 12 are parallel or random laid with a cross linked binder of an acrylic resin or other conventional substitute adhesive. In a preferred example the weight of the glass sheet 12 should be of the order of 25 grams per square meter and the sheet is to have a so-called air burst strength which is expressed as 4 Kilopascals applied to an exposed piece of material of 100 millimeters in diameter. Additionally, the construction of the filter sheet 12 is such that it is capable of filtering particles of 10 microns in size and preferably particles in the range of 1 to 3 microns in size.

On each side of the sheet of bonded glass fiber is arranged at least one sheet of bonded fibers such as bonded fabric fibers 13. Conveniently on the outer side of the glass fiber sheet there is one sheet of bonded fabric fibers whereas on the inner side there are two such sheets, the terms "outer" and "inner" being applied with reference to the intended direction of flow through the filter material so that the outer side is the side from which the unfiltered fluid enters the assembly.

Sheets 13 are of synthetic resin fibers, an example of which is formed from parallel laid fibers of 75 microns thickness formed of 100% regenerated cellulose in the form of viscose rayon. Other synthetic fibers such as for example nylon or terylene can however be used and the fibers in the sheets are bonded together by resin or any other conventional substitute suitable adhesive.

There are also provided two sheets of metallic wire mesh 14 such as aluminum wire mesh which are disposed respectively on the two sides of the assembly in engagement with the bonded fabric fiber sheets. Thus, in the particular example described there are six sheets in the assembly namely a glass fiber sheet 12 which is backed on one side by two bonded fabric fiber sheets 13 and on the other side by one bonded fabric fiber sheet 13, all of the sheets being enclosed between the two aluminum wire mesh sheets 14.

Figure 2:
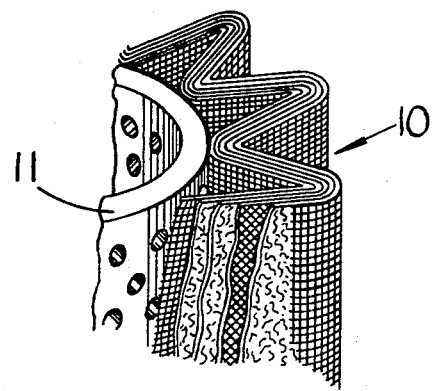
FIG. 2 is a fragmentary perspective view showing one form of filter incorporating filter material made in accordance with the invention.
Figure 3:
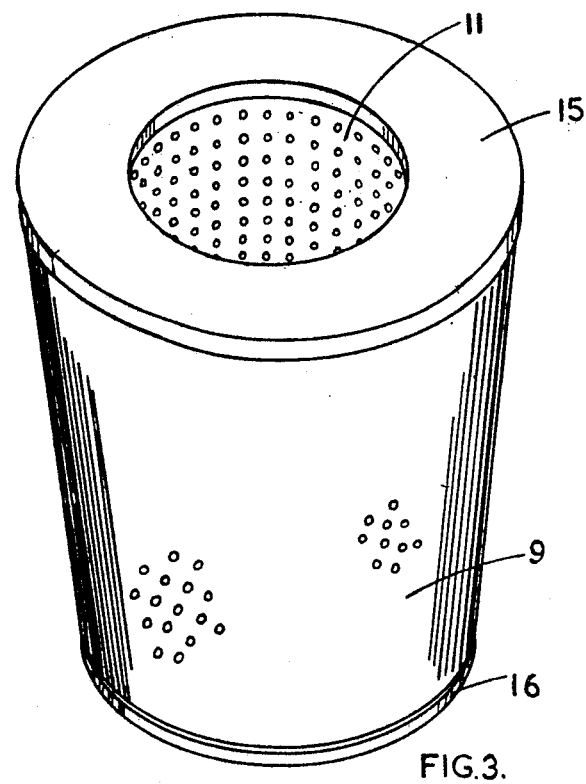
FIG. 3 is a perspective view of the filter material assembly of the invention.

The various layers forming the complete assembly namely the sheet 12, the various sheets 13, and the sheets 14 are not secured together over the whole of their surface area but are to some extent held together by the pleating which is depicted in FIG. 2 of the drawings. However, additional security is provided in use by end caps, as shown in FIG. 3 of the drawings, namely an upper end cap 15 and a lower end cap 16 which is placed over the assembly with adhesive being used between the interior of each end cap and the adjacent axial end of the pleated assembly to secure the end caps in position. As an alternative, each end cap can be formed of a synthetic resin material which is placed in contact with the pleated assembly when in a plastic or molten condition so that each end cap will be fused or intimately bonded to the pleated assembly.

As previously mentioned, the sheet of glass fiber material provides the filtration media and in effect will effect very fine filtration within a range of 1 to 3 microns. This glass fiber sheet is rather delicate but crushing or disintegration of it is avoided by use of the aforesaid bonded fiber sheets and metallic wire mesh sheets which provide adequate support to both sides of the glass fiber sheet.

The filter of the present design is of particular usefulness in filtering liquids and with the depicted embodiment employs only one filtering medium, namely the sheet 12. Since the sheet 12 is of somewhat delicate construction, the other sheets of the assembly are provided to support the filter medium. The overall assembly is composed of a number of relatively thin sheets thereby providing a structure which is not bulky in construction. By employing thin sheets, it is apparent that it is also possible to facilitate the pleated construction as shown. When folded into a pleated construction, the filter assembly offers a relatively large surface area of filter medium in a relatively small and compact space and this provides a considerable advantage.

Thus the several aforenoted objects and advantages are most effectively attained. Although several somewhat preferred embodiments have been disclosed and described in detail herein, it should be understood that this invention is in no sense limited thereby and its scope is to be determined by that of the appended claims.

What is claimed is:

1. A multi-layer filter material assembly comprising; a filter medium which consists solely of a single delicate sheet formed of fibers of a glass, the fibers being formed in a layer and bonded together and capable of filtering particles on the order of 1.10 microns, said filter medium being supported on each side by at least one support sheet of a bonded synthetic fiber fabric and a sheet of metallic wire mesh, the two sheets of metallic wire mesh thus provided forming respectively the two outer most layers, the whole assembly adapted to be formed into a pleated configuration with the fiber fabric and mesh layers providing support for both sides of the glass fiber sheet, the glass sheet forming the only filtering medium in the assembly, and the support sheet avoiding crushing or disintegration of the delicate glass sheet.

2. The invention in accordance with claim 1 wherein the sheet formed of fibers of glass has a low coefficient of thermal expansion.

3. The invention in accordance with claim 1 wherein the sheet of fibers of glass is formed of borosilicate glass.

4. The invention in accordance with claim 1 wherein each of said sheets of metallic wire mesh is formed from alluminum wire.

5. The invention in accordance with claim 1 wherein two sheets of bonded fiber fabric are provided on the inner side of said glass fiber sheet.

* * * * *